: 3,436,727
Patented Apr. 1, 1969

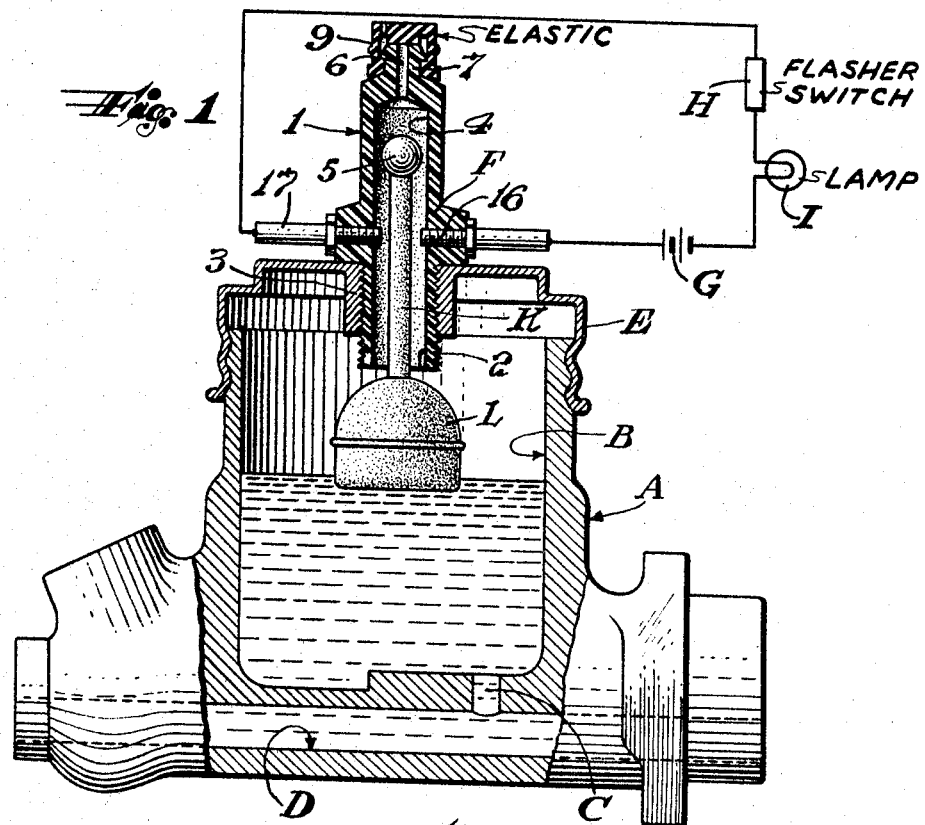
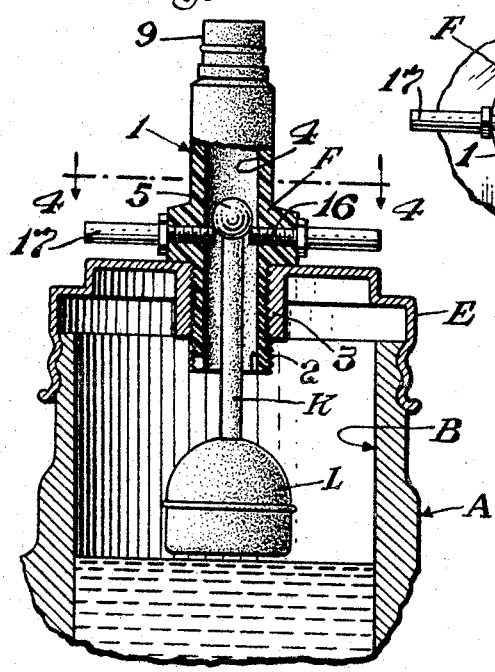
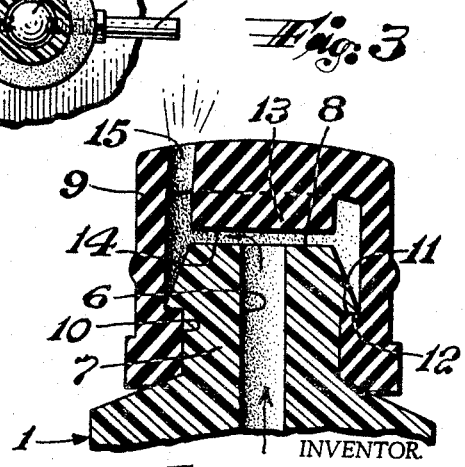

3,436,727
HYDRAULIC BRAKE LIQUID LOSS SIGNAL WITH MOISTURE EXCLUDING AIR VENT
Frank Pagano, Sr., Newark, N.J., Rose Pagano, Frank Pagano, Jr., and Robert Pagano, executors of said Frank Pagano, Sr., deceased, assignors to Surelock Manufacturing Co., Inc., Newark, N.J., a corporation of New Jersey
Filed Jan. 3, 1966, Ser. No. 518,105
Int. Cl. G08b 21/00
U.S. Cl. 340—59          1 Claim

ABSTRACT OF THE DISCLOSURE

A liquid loss signal for a hydraulic brake is controlled by a float responsive to rise and fall of the level of liquid in a reservoir. A vent for the reservoir has an external valve seat with which cooperates an elastic cap valve normally seated by its inherent resiliency and upon rise of the liquid level being unseated by air pressure which escapes through an aperture in said cap valve.

---

This invention relates in general to apparatus comprising a closed liquid reservoir, and means including an audible or visible signal for indicating a drop in the level of the liquid in the reservoir beyond a predetermined or normal level; and more particularly the invention contemplates a warning apparatus of this character in combination with a hydraulic brake system of a vehicle so that the driver of the vehicle will be warned when an excessive loss of brake fluid occurs in the brake system, during both normal and abnormal brake conditions.

A primary object of the invention is to provide such apparatus including means providing for venting of air from the reservoir during a rise of the liquid level therein and to prevent moisture and atmospheric pressure from getting into the hydraulic system at all other times and especially upon a loss of liquid from the reservoir.

Other objects, advantages and results of the invention will be brought out by the following description in conjunction with the drawings in which:

FIGURE 1 is a view partially in central vertical section and partially in elevation of a liquid reesrvoir or master cylinder of a hydraulic brake system having a signal apparatus embodying the invention associated therewith, showing the parts in the positions assumed when the liquid level is normal;

FIG. 2 is a similar view with portions broken away, but showing the positions of the parts upon an excessive loss of liquid from the reservoir, FIGURE 3 is an enlarged fragmentary central sectional view showing the vent valve during a rise in the level of the liquid and venting of air from the reservoir, and FIGURE 4 is a horizontal sectional view on the plane of the line 4—4 of FIGURE 2.

Specifically describing the embodiment of the invention the reference character A designates a liquid reservoir, for example the master cylinder of a hydraulic brake system having a chamber B therein the lower end of which is connected by a port C to a passage D one end of which is connected to the foot pedal pump of the system and the other end of which is connected to the brake cylinders in known manner.

In accordance with the invention, the upper end of the reservoir chamber is closed by a cap E in which is mounted a combined float-operated switch and vent valve generally designated F.

As shown, the combination float-operated switch and vent valve comprises a body 1 preferably formed of a synthetic plastic and electrical insulating material, one end of which is externally screw-threaded at 2 and screwed into a complementary threaded boss 3 on the cap E. The body has a longitudinal passage 4 therein in which is reciprocable a ball switch head 5 carried at one end of a rod K the other end of which has connected thereto a float L.

The end of the body opposite the thread 2 has a restricted vent passage 6 communicating with the passage 4 and opening through the end of a reduced extension 7 the outer end 8 of which is preferably flat and in a plane perpendicular to a vent passage 6. Mounted on and connected to the extension 7 is a vent cap 9 formed of elastic material and having an internal circumferential flange 10 provided with a shoulder 11 on its inner side that underlies a shoulder 12 on the extension 7, as best shown in FIGURE 3, the cap preferably being snapped onto the extension and held in position thereon by the resilient engagement of the shoulder 11 of the cap with the shoulder 12 of the extension.

The cap has an internal projection 13 comprising in effect a valve head and having a flat end surface 14 to normally abut the surface 8 of the extension as shown in FIGURE 1, the valve head being held in contact with the surface 8 by the inherent resiliency or elasticity of the cap, so as to close the vent passage 6 as shown in FIGURE 1. The vent passage is thus closed during a normal liquid level in the reservoir chamber B and during a lowering of the said liquid level, for example, as a result of a loss of the liquid from the brake system. The cap valve thus prevents moisture and atmospheric pressure from getting into the hydraulic system.

However, the cap valve also provides for an easy and quick venting of air from the reservoir upon a rise of the liquid level. As shown, the cap valve has a restricted vent aperture 15 leading from the interior of the cap at one side of the valve head surface 14 and the valve seat surface 8, to the atmosphere, and when air pressure is created in the reserve chamber above the surface of the liquid as the level of the liquid rises, it lifts the valve head off the valve seat as shown in FIGURE 3 so as to permit the air in the reservoir chamber to escape through the vent passage 6, and the vent aperture 15 to the atmosphere.

Upon an excessive loss of liquid from the reservoir chamber, the float falls from the position shown in FIGURE 1 to a position shown in FIGURE 2 and in the latter position engages two electrical contact elements 16 and 17 that are secured in the body 1 and project into the passage 4 in spaced relation to each other. The contact elements are connected in any suitable electrical circuit, but as shown are connected in a circuit with a source of electricity G, a flasher switch H of known construction and an electric lamp I or an audible electrical signal. When the contact ball 5 engages both of the elements 16 and 17, the circuit is closed to energize the signal, while when the contact ball is elevated by the float out of contact with the elements 16 and 17, the circuit is broken.

Preferably the parts will be so constructed that the ball 5 will be prevented from closing the vent passage 6; for example, the float might engage the lower end of the body 1 which might be notched to ensure free passage of the air between the float and the body.

From the foregoing it will be seen that the elastic cap valve provides a yielding resistance to the escape of air and moisture but ensures that the air and moisture will escape adequately to permit the rise of the liquid level, and also the cap valve prevents the influx of moisture and atmospheric air into the reservoir chamber upon a loss of liquid from the system that causes a lowering of liquid level. The inveniton thus constitutes a definite improvement of known devices that permit free influx of air into the reservoir and other devices that involve complicated and expensive elastic diaphragms that close the outer end of the reservoir.

I claim:
1. A hydraulic brake system liquid loss signal, comprising a liquid reservoir having a liquid chamber, a float-operated signal including a float in said liquid responsive to rise and fall of the liquid level, a vent valve for said chamber including a body having a vent passage therethrough, and a valve controlling said vent passage, said valve normally closing said passage against influx of moisture and air into said chamber and being operable by air pressure upon rise of said liquid level to permit the venting of air from said chamber, said body having a valve seat surface at its outer end encircling said vent passage, and said valve comprising an elastic cap having a valve head normally yieldingly held in contact with said valve seat surface of the body to close said vent passage and having a restricted vent aperture offset from said valve surface, providing for the forcing of said valve head off said valve surface by rising fluid pressure in said chamber incident to a rise in the liquid level and further providing for subsequent elastic reseating of said valve head on said valve seat surface upon falling of said pressure incident to a lowering of said liquid level, fluid being vented from said chamber upon said rising of the pressure thereof, and influx of air and moisture into the chamber being prevented upon falling of said pressure.

References Cited

UNITED STATES PATENTS 2,825,895   3/1958   Malagarie _____ 200—84 XR

ALVIN H. WARING, *Primary Examiner.*

U.S. Cl. X.R.

340—244; 200—84; 73—308, 313